US006206144B1

(12) United States Patent
Di Bella

(10) Patent No.: US 6,206,144 B1
(45) Date of Patent: Mar. 27, 2001

(54) BICYCLE BRAKE SYSTEM

(75) Inventor: Fabrizio Di Bella, Albino (IT)

(73) Assignee: Rivolta S.p.A., Milan (IT)

( * ) Notice: Subject to any disclaimer, the term of this patent is extended or adjusted under 35 U.S.C. 154(b) by 0 days.

(21) Appl. No.: 09/173,175

(22) Filed: Oct. 15, 1998

(30) Foreign Application Priority Data

May 5, 1998 (IT) .............................................. MI98A0970

(51) Int. Cl.[7] .................................................... B62L 5/00
(52) U.S. Cl. .......................................................... 188/26
(58) Field of Search .............................. 188/26, 17, 72.7, 188/72.9, 2 D, 218 XL

(56) References Cited

U.S. PATENT DOCUMENTS

| 3,989,124 | * | 11/1976 | Fujii | 188/26 |
|---|---|---|---|---|
| 4,029,179 | * | 6/1977 | Butz | 188/71.8 |
| 4,109,762 | * | 8/1978 | Wood | 188/26 |
| 5,421,435 | * | 6/1995 | Hanada | 188/24.14 |
| 5,632,362 | * | 5/1997 | Leitner | 188/344 |
| 5,950,772 | * | 9/1999 | Buckley et al. | 188/26 |
| 5,960,914 | * | 10/1999 | Isai | 188/72.8 |

FOREIGN PATENT DOCUMENTS 327876   3/1998   (TW) .

* cited by examiner

*Primary Examiner*—Christopher P. Schwartz
*Assistant Examiner*—C. T. Bartz
(74) *Attorney, Agent, or Firm*—Nixon & Vanderhye P.C.

(57) ABSTRACT

A bicycle brake system includes a disc mounted floatingly on a hub and a brake unit mounted floatingly on a fork. A mechanically actuated cam mechanism causes actuation of a first lining which presses against the disc compressing it, due to the above floating assembly, against a second line which remains fixed, thus causing the braking action.

11 Claims, 4 Drawing Sheets

BICYCLE BRAKE SYSTEM

BACKGROUND

The present invention relates to a disc brake system, with mechanical operation, for bicycles, particularly suitable for use on mountain, all-terrain and racing bikes, on road or track.

At present, most disc brake systems for bicycles available on the market make use of a hydraulic system to press the brake linings on the disc. All hydraulic disc brakes, according to the known art, have a caliper mounted in a fixed manner and equipped with two opposed pistons which, under the action of the hydraulic system, press the linings against the disc to cause braking. This solution, besides being of excessively complicated construction, requires absolutely precise assembly, to avoid undesirable friction between the linings in the resting position and the disc.

Furthermore, hydraulic disc braking systems require replacement of the normal brake levers attached to the handlebar with other types of levers integrated with the hydraulic circuit.

Heavy use of the brakes causes overheating of the hydraulic system which results in poor operation and the possibility of breakage.

Furthermore, these systems oblige the user to carry out frequent bleeding and/or topping up of the hydraulic circuit, difficult operations even for specialized mechanic-cyclists.

Based on what is described above, hydraulic braking systems are clearly subject to some drawbacks such as an excessive cost, poor resistance to high temperatures, and excessively complex installation and maintenance.

These drawbacks are solved in part by mixed hydraulic and mechanical braking systems. In these known braking systems, the caliper is hydraulically operated, but is actuated by a cable controlled by traditional levers applied on the handlebar. These calipers are mounted, by means of fixing pins, in a floating manner on the fork, so as to allow self-centering during braking. Braking is achieved by means of the pressure of a single small piston connected to the caliper which thrusts a lining against the disc. With this system the friction due to imperfect alignment or a partial return of a lining to the resting position is eliminated.

This mixed braking system, however, has limits to its performance at high temperatures. In fact the "extreme miniaturization" (limited surface of contact during braking) and the difficulty in guaranteeing the complete return of the linings to the resting position under all conditions, prevent heat dissipation. Besides a considerable variability in performance, overheating of the braking system causes boiling of the fluid in the hydraulic circuit and sometimes failure of the seals, which in any case have a limited life.

Because of the above mentioned problems, some attempts at totally mechanical disc brakes have been made in the prior art. These known braking systems use a caliper with a fixed mounting, operated by means of a cable controlled by the connected braking lever on the handlebar. Rolling of two/three balls each on an inclined track is exploited to press the linings against the disc.

This mechanical system, however, also has various drawbacks. The caliper mounted in a fixed manner does not allow self-centering thereof during braking, causing undesirable friction when the linings are in the resting position.

The balls, which have a very small surface of contact, rapidly score the sliding ramps. This causes a considerable increase in friction which, after a few operations, is such as to invalidate the braking system.

These known mechanical brake systems, moreover, cannot achieve the performance in terms of power of the present hydraulic braking systems.

SUMMARY OF THE INVENTION

The object of the invention is to eliminate these drawbacks, providing a bicycle braking system that is economical and simple to make.

Another object of the invention is to provide such a braking system with a high braking power and that guarantees excellent reliability under the heaviest working conditions.

Another object of the invention is to provide such a braking system that is simple to assemble and maintain and can be installed on existing bicycles without requiring particular modifications.

In the bicycle brake system according to the invention, a disc brake comprising a caliper mounted floatingly on pins connected to the fork is used on at least one wheel. To achieve braking, a single lining is pressed on the disc by a small piston operated by a cam system, consisting of at least a pair of inclined opposing ramps, on which the same number of rollers operate.

It is preferred to use rollers instead of balls in that the surface of contact of the rollers is considerably greater than that of the balls; as a result there is therefore a drastic reduction in rolling friction.

The return of the lining to the resting position is ensured by spring structure and the return of the caliper to the resting position is ensured by self-centering due to the floating assembly thereof and aided by the presence of small snap rings or O-rings placed on the fixing pins.

The disc is fixed to the hub by means of splined fitting. This system offers a more rational distribution of the loads than the conventional system, in which screws are inserted directly into the body of the hub, and also makes removal of the wheel faster and easier in the event, for example, of replacement of one or more spokes. The disc is also fixed floatingly, by interposition of a snap ring between its fixing star and the rim on the hub. This allows a certain axial adjustment, facilitating the return thereof to the resting position after braking and thus avoiding the friction that penalizes the other known types of disc brakes.

BRIEF DESCRIPTION OF THE DRAWINGS

Further characteristics of the invention will be made clearer by the detailed description that follows, referring to a purely exemplary and therefore non-limiting embodiment thereof, illustrated in the appended drawings, in which.

DETAILED DESCRIPTION OF PREFERRED EMBODIMENTS

Figure 1:
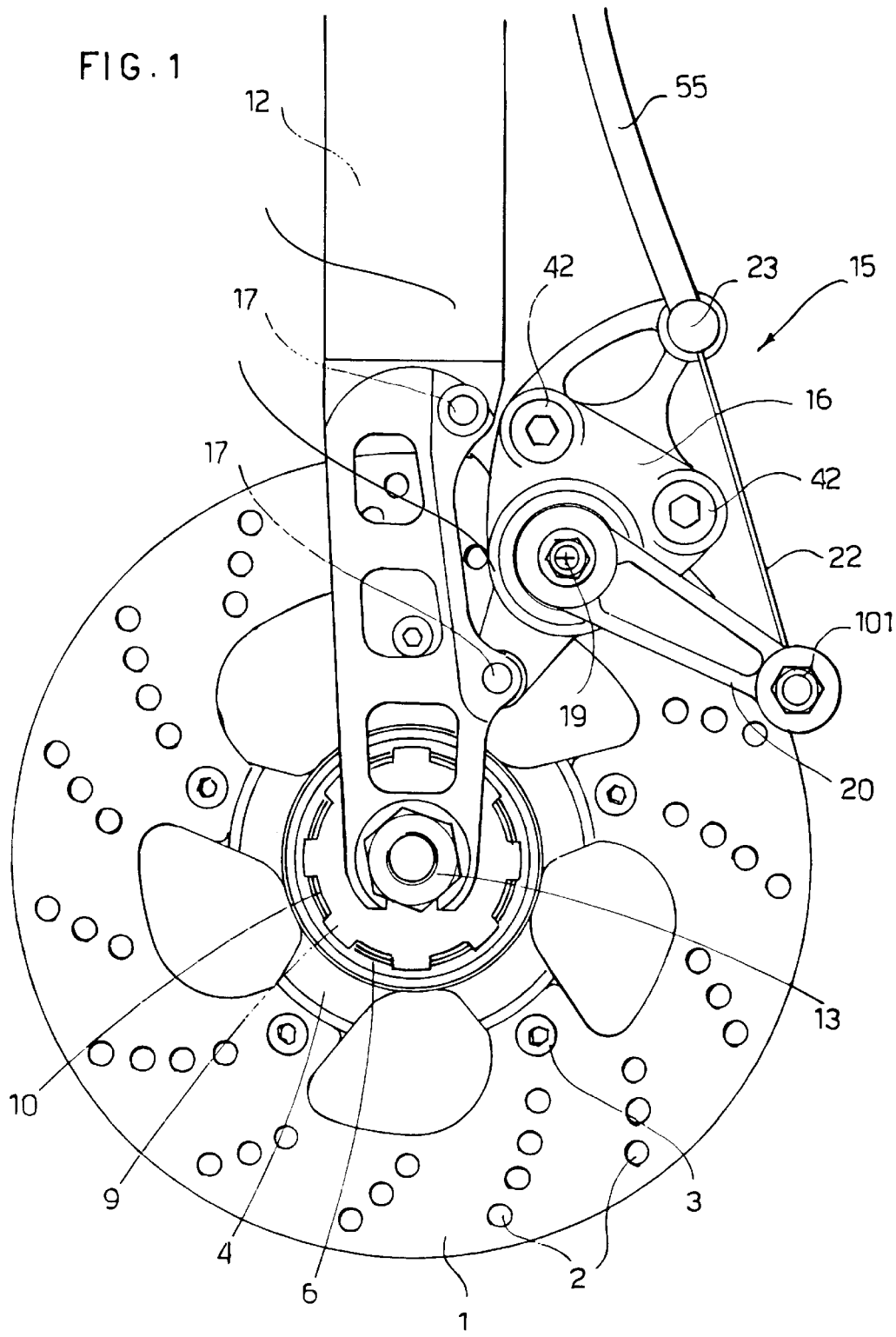
FIG. 1 is a front view of the brake system for bicycles according to the invention.
Figure 2:
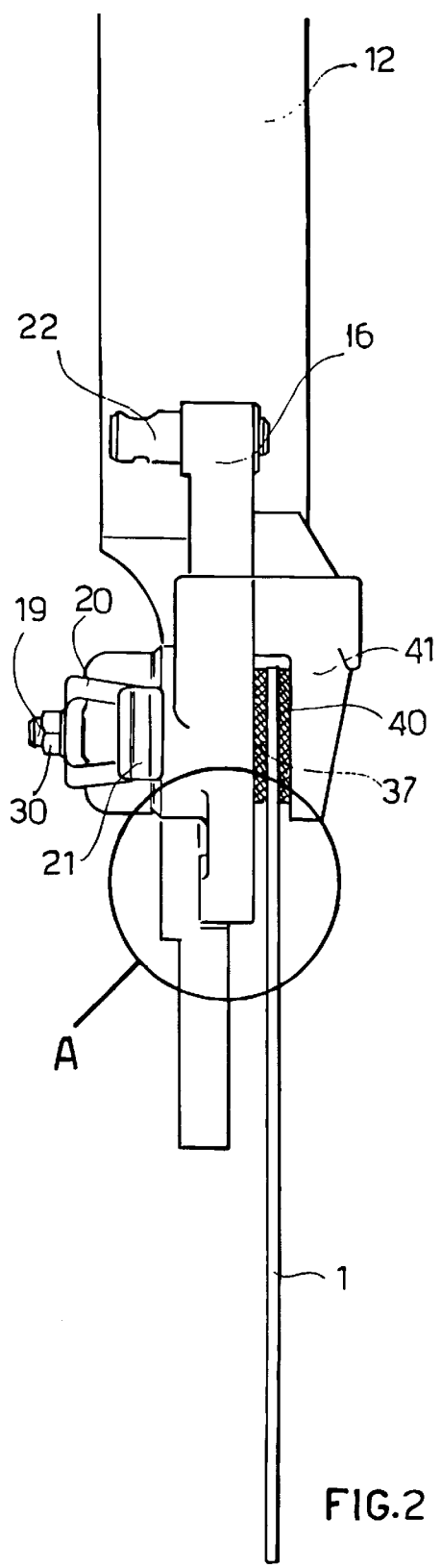
FIG. 2 is a side profile view of the brake system in FIG. 1.
Figure 3:
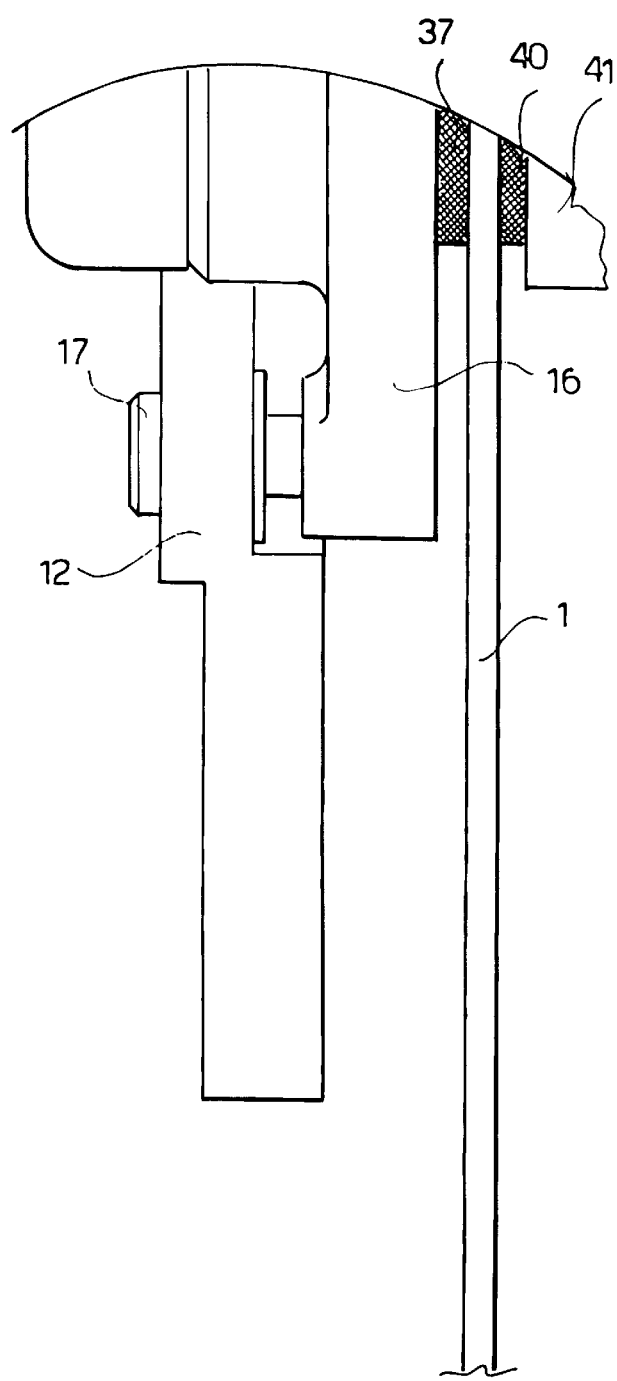
FIG. 3 is an enlarged view of the part of FIG. 2 enclosed in the circle indicated by A.
Figure 5:
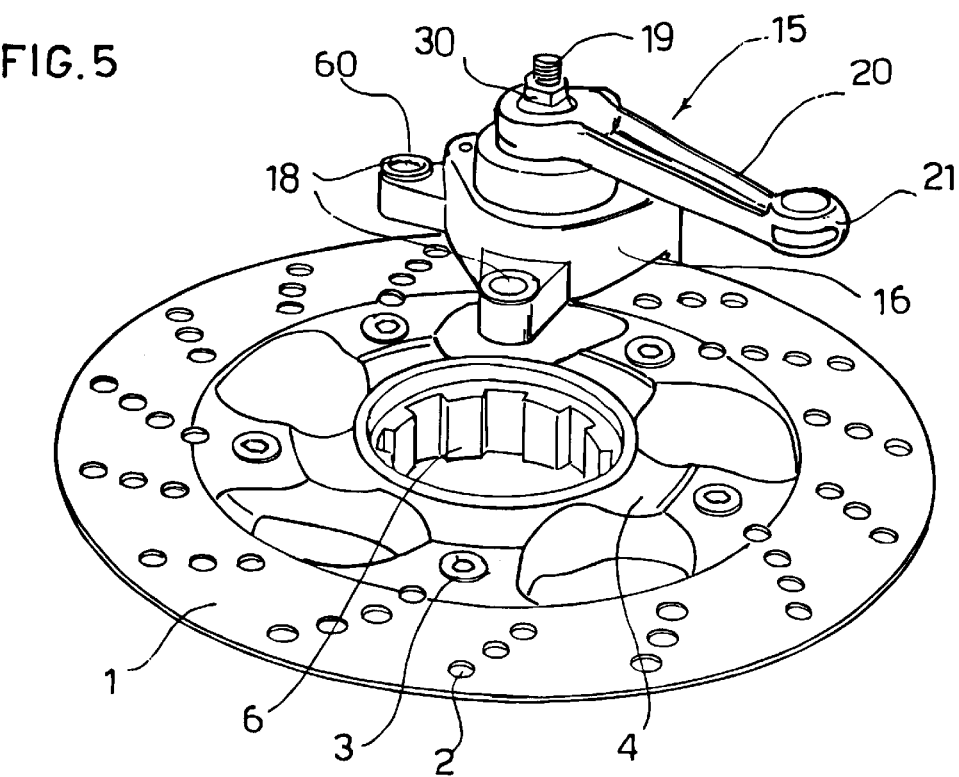
FIG. 5 is an axonometric view of a disc with the brake unit according to the invention connected.

With reference to FIGS. 1 and 5, a disc 1 is preferably made of steel with a high friction coefficient and has countersunk lightening holes 2. The disc 1 is suitably subjected to grinding and a final check on flatness. The disc 1 is connected by means of bolts 3 to disc holding star 4 or flange (with five spokes in the example in FIGS. 1 and 5).

Figure 6:
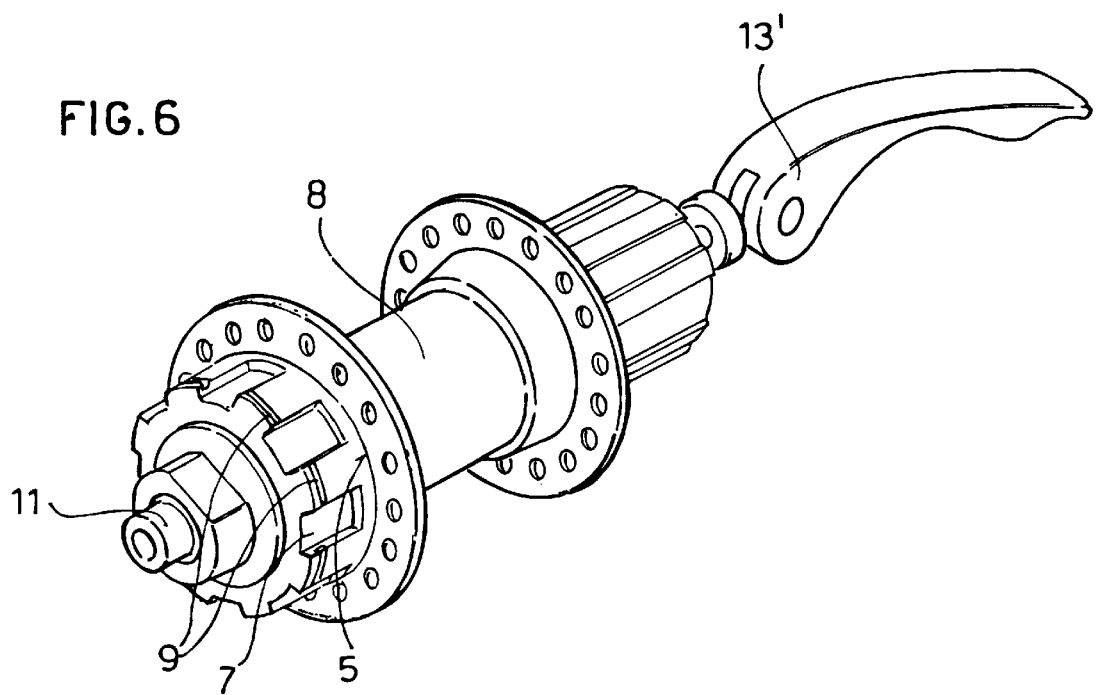
FIG. 6 is an axonometric view of a hub suitable for accommodating the disc in FIG. 5.

The disc holding star 4, preferably of tempered aluminium alloy, has a central hole, in the inner surface of which a splined mating part 6 is made. The splined mating part 6 is able to engage with a complementary splined mating part 7, made on the outer surface of an end of a hub 8 (FIG. 6). A gasket 5 preferably of rubber and of the O-ring type able to impart a certain clearance to the disc 1 is applied to the splined mating part 7 of the hub 8. Again in the splined mating part 7, a seat 9 is provided such as to receive a metal ring 10 to block the disc 1.

The hub 8 has at its two ends two cylindrical blocks 11 able to engage in suitable concave seats made in the two ends of a bicycle fork 12. Fixing of the hub 8 to the fork 12 takes place, in a known manner, by means of levers 13, 13' that can also be operated manually.

Figure 4:
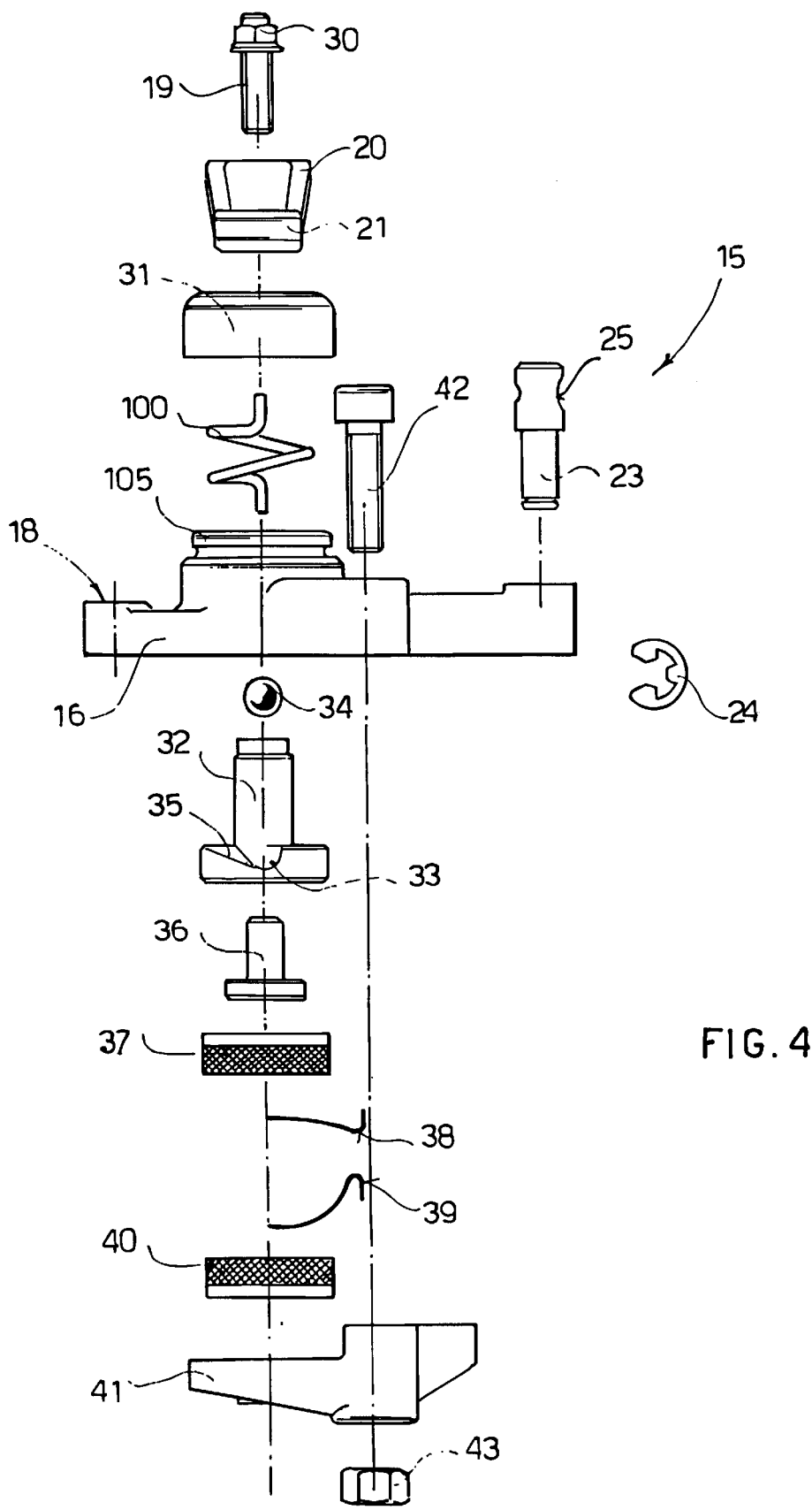
FIG. 4 is an exploded view of the brake unit according to the invention.

The brake unit, indicated generally by reference numeral 15, is shown exploded in FIG. 4. The brake unit 15 comprises a caliper formed by an external caliper body 16 which is positioned externally with respect to the disc 1. The external caliper body 16 has two through holes 18 (FIG. 5) able to receive the ends of two pins 17. The pins 17 are retained inside the holes 18, and O-rings 60 are provided to confer a floating type coupling. The other end of the pins 17 is threaded and is blocked by means of nuts in holes made in the fork 12.

In the outer caliper body 16, a hollow seat 105 is provided wherein a screw 19 engages to lock a control lever 20 by means of a nut 30. A return spring 100 is inserted around the screw 19. In this manner, the position of the control lever 20 is adjusted by acting on the nut 30 in order to be able to regulate the type of braking desired.

The control lever 20 has a groove 21 able to accommodate the cable 22 (FIG. 1) to be connected to the lever (not shown) of a brake on the handlebar. The end of the cable 22 is blocked in the cavity 21 by means of a bolt 101. Again in the outer body 16 of the caliper, a through hole is provided wherein a sheath-fastening pin or revolving pin 23 engages. The pin 23 is blocked at the bottom by an open snap ring 24 (FIG. 4) so as to be able to turn freely inside the through hole. The pin 23 has a through hole 25 through which the cable 22 is inserted, and at one end of the pin 23 the sheath 55 that covers the cable 22 is blocked.

The spring 100 around the screw 19 is preferably covered by a dust guard 31 of rubber or synthetic material.

A hollow body 13 having a substantially upturned T-shaped section, that is having a cylindrical tang with a disc-shaped base, is positioned inside the outer caliper body 16. In the base of the hollow body two opposing seats 33 are created (only one visible) able to accommodate a pair of rollers 34, integral in position with respect to the caliper body 16. The seats 33 communicate with a pair of opposed cams 35 (only one visible) with an opposite incline.

When the brake lever on the handlebar is actuated, pulling of the cable 22 causes shifting of the lever 20 that actuates the screw 19 that is integral with the hollow body 32. The hollow body 32 thus rotates and is pushed downward through the action of the cams 35 which slide on the pair of rollers 34.

A small piston 36 is inserted freely inside the hollow body 32. The small piston 36, descending together with the hollow body 32, without making any rotation, strikes against an external brake lining 37, bringing it close against the surface of the disc 1. In this manner, there being no sliding friction between the contact surfaces of the small piston 36 (which is free to rotate inside the hollow body 32) and the brake lining 37, it is possible to prevent any wear of the contact surfaces of the brake lining and the piston.

The brake lining 37 is housed inside a special seat made in the outer caliper body 16 and is held in this seat by a return spring 38 which ensures the return thereof to the resting position when the braking action is finished.

An inner brake lining 40 destined to remain fixed in its position is fixed by means of a stop spring 39 to an inner caliper body 41. The inner caliper body 41 is rigidly connected to the outer caliper body 16 by means of bolts 42 locked at the bottom by stop nuts 43.

When the piston 36 causes the advance of the brake lining 37 that strikes against the disc 1, thanks to the floating coupling between the brake unit 15 and the fork 12, and between the disc 1 and the hub 8, the brake unit 15 and the disc 1 make a slight axial movement and therefore the disc 1 is compressed between the linings 37 and 40 thus obtaining effective and perfectly balanced braking.

When the braking action ends, through the action of the return spring 38, the brake lining 37 returns to its resting position, again thanks to the floating coupling between the brake unit 15 and the fork 12, and between the disc 1 and the hub 8, the brake unit 15 and the disc 1 make a slight axial movement and therefore the disc 1 is placed in a perfectly equidistant position between the two brake linings 37 and 40, thus limiting the sliding friction to a minimum.

The above description makes clear the advantages of the solution proposed by the invention, which proposes a disc braking system for bicycles, with floating mounting and completely mechanical twin cam operation.

What is claimed is:

1. A brake system for bicycles comprising:
    a disc mounted floatingly on a hub;
    a brake unit with a pair of brake linings mounted floatingly on a fork; and
    a cam mechanism cooperating with the brake unit for mechanically actuating at least one of the brake linings.

2. A brake system according to claim 1, wherein said disc engages with said hub by means of respective splined profiles.

3. A brake system according to claim 2, further comprising an O-ring and said hub, said O-ring effecting the floating coupling between said disc and said hub.

4. A brake system according to claim 1, wherein said brake unit is fixed to the fork by pins after interposition of O-rings able to effect the floating coupling between said brake unit and said fork.

5. A brake system according to claim 1, wherein said cam mechanism comprises a hollow body with opposed external seats connected to respective cam profiles, for housing and sliding of respective rollers, integral in position with the body of the unit such that with mechanical actuation of the brakes, screw means integral with said hollow body cause the hollow body to rotate and thus to advance through sliding of the cams on the rollers, causing actuation of said at least one brake lining.

6. A brake system according to claim 5, wherein said hollow body acts on the brake lining through a piston housed freely therein.

7. A brake system according to claim 1, further comprising a return spring engaging said at least one brake lining and housed in a groove made therein, said return spring urging a return of the at least one brake lining once braking is finished.

8. A brake system according to claim 1, further comprising an actuation lever connected at one end to a brake cable and at the other end to the brake unit by screw means.

9. A brake system according to claim 8, further comprising a return spring placed around said screw means so that positioning of said actuation lever can be adjusted by an adjustment nut.

10. A brake system according to claim 1, further comprising a revolving pin having a through hole and a brake cable inserted in said through hole that blocks a sheath of said brake cable.

11. A brake system for a bicycle mountable on a bicycle frame including a fork and a bicycle wheel including a hub, the brake system comprising:
   a braking disc axially floatingly coupled on the hub; and
   a brake unit axially floatingly mounted on the fork, the brake unit including a cam mechanism in operative engagement with a pair of opposing brake linings, wherein the pair of brake linings are selectively engageable with the braking disc via actuation of the cam mechanism.

\* \* \* \* \*